No. 893,714. PATENTED JULY 21, 1908.
C. W. FINCH.
SLIDE CARRIER FOR STEREOPTICON LANTERNS.
APPLICATION FILED FEB. 25, 1908.

WITNESSES:
a. B. Cornelius
Luke E. Hinton.

INVENTOR
Charles W. Finch.
BY
George W. Hinton,
ATTORNEY

UNITED STATES PATENT OFFICE.

CHARLES W. FINCH, OF ST. JOSEPH, MISSOURI, ASSIGNOR OF ONE-HALF TO MATILDA R. STEPHENSON, OF ST. JOSEPH, MISSOURI.

SLIDE-CARRIER FOR STEREOPTICON-LANTERNS.

No. 893,714.  Specification of Letters Patent.  Patented July 21, 1908.

Application filed February 25, 1908. Serial No. 417,708.

*To all whom it may concern:*

Be it known that I, CHARLES W. FINCH, a citizen of the United States, residing at St. Joseph, in the county of Buchanan and State of Missouri, have invented certain new and useful Improvements in Slide-Carriers for Stereopticon-Lanterns, of which the following is a specification, reference being had therein to the accompanying drawing.

My invention relates to improvements in slide carriers, for stereopticon lanterns, and has for its objects, the provision of a slide carrier, that will afford every facility for the easy and extremely rapid change of transparencies or slides with the minimum amount of labor and care, on the part of the operator, and in which a full set of said slides, will be exposed in their consecutive order, and in which each and every slide in said set, will be brought into exact register with the condensing lenses in said lantern; further objects are, to so arrange and construct a slide carrier, that by its use the soiling and breaking of slides will be inexcusable, on the part of the operator, and to construct a slide carrier that shall be neat in appearance, durable and be extremely cheap in cost of manufacture; and be adapted for use in connection with the variously constructed lanterns now in operation. I attain these objects by the mechanism illustrated in the accompanying drawing, in which:—

Figure 1:
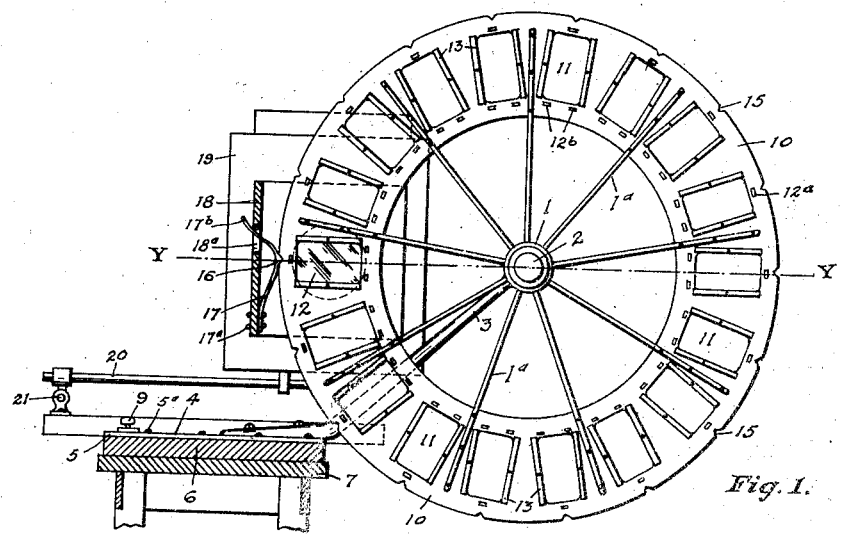
Figure 2:
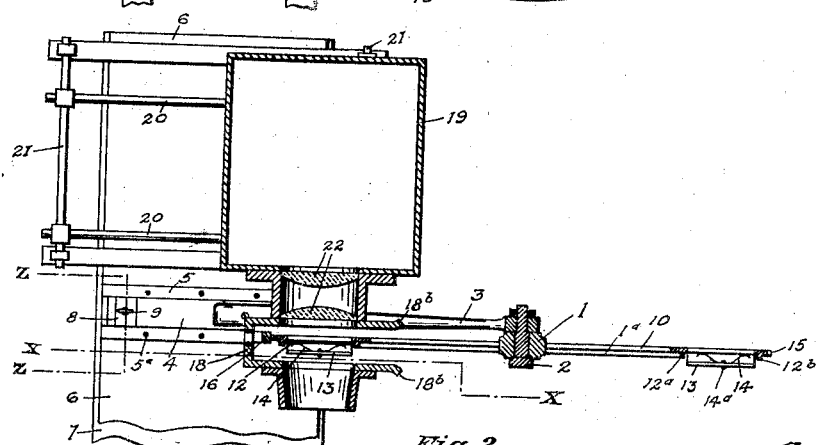
Figure 3:
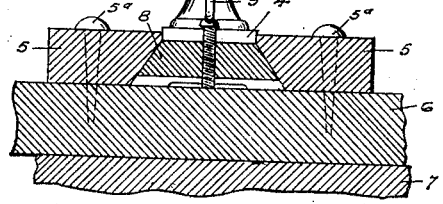
Figure 4:
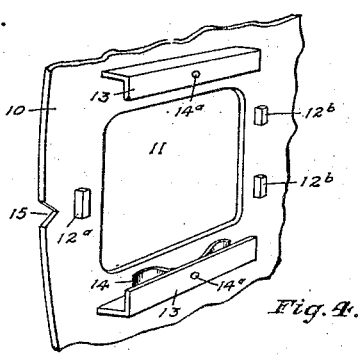

Figure 1. is a vertical section, cut on the line X X, seen in Fig. 2. Fig. 2. is a longitudinal section of the carrier and of a lantern, cut on the line Y Y, seen in Fig. 1. Fig. 3 is an enlarged vertical section, in detail of the ways and carriage stop, cut on the line Z Z, seen in Fig. 2. Fig. 4 is an enlarged view in perspective of one of the slide holding devices.

My invention comprises a wheel 1, rotatable on stud 2, secured in the upper end of arm bracket 3, secured on carriage 4, slidable in ways 5, secured by screws 5ᵃ on base 6, mounted on an ordinary table 7; carriage 4 has its inward movement limited by carriage stop 8, adjustably secured in ways 5, by thumb screw 9, adapted to force stop 8 upward against ways 5; wheel 1 is provided with spokes 1ᵃ, on the outer end portions of which is mounted the annular aperture piece 10, in which is formed the apertures 11, adapted to be covered by slides 12, removably held in place over said apertures by flanges 13, secured on aperture piece 10; flanges 13 are each provided with a spring 14 secured on the inner side thereof, by rivet 14ᵃ, and adapted to press one edge of a slide 12 and together with its opposite and duplicate device to press said slide against piece 10, and to removably hold said slide in place, between slide holding studs 12ᵃ and 12ᵇ, formed on piece 10 as seen in Figs. 1 and 2.

Piece 10 is provided with V shaped register notches 15, formed in the periphery thereof, and are normally engaged by the V shaped dog 16 formed on spring 17, secured in tube holder 18, by rivets 17ᵃ; spring 17 is extended through aperture 18ᵃ, in said tube holder and terminates as a thumb piece 17ᵇ, for manually moving said dog, if in operation, such should become necessary.

The ordinary lamp house 19, of a stereopticon lantern, laterally slidable on rods 20, longitudinally adjustable on rods 21, (seen in Fig. 2.,) is provided with outwardly curved front and rear sides 18ᵇ of tube holder 18, adapted to receive the heretofore described slide carrier between them.

In the operation of the slide carrier, a series of slides 12 are, in consecutive order, each passed over one of the slide holding studs 12ᵃ, and between the springs 14 and piece 10 until stopped by studs 12ᵇ, after which said slide is released and springs 14 presses said slide against piece 10 and between slide holding studs 12ᵃ and 12ᵇ; lamp house 19 is moved on rods 20, to the position seen, after which carriage 4, carrying the described slide carrier, is moved in ways 5 until slide 12 is in register with condensing lenses 22, with dog 16 resting in register notch 15, after which, slide 12 is ready for exposure, and after its proper time of exposure has expired, the operator, (not shown,) grasps the edge of piece 10 and overcoming spring 17, forces said piece and its attached parts to rotate on stud 2, until the next aperture 11, covered by the next slide 12, is brought in register with condensing lenses 22, and so on, until the entire series of slides 12 are exposed, after which the said series of slides or any part thereof, as desired, (for such as the repeating of choruses, in illustrated songs, and the like,) may again be exposed. It will be seen from the foregoing that slides 12, can not be exposed out of their consecutive order, unless they have previously been improperly placed in the described slide carrier.

It will readily be understood, that where a lamp house 19, slidable on rods 20, is used, that the once adjusted carriage 4, and parts carried thereby are not moved laterally, but that said lamp house is moved laterally on rods 20, as is usually done in order to bring lenses 22 in register with other and different apparatus, not shown, and after such use is returned, as described, in register again with slide 12. In cases where said lamp house is not moved laterally, the described slide carrier is caused to move from between the sides 18ᵇ, of tube holder 18, by moving carriage 4, (guided by ways 5,) from carriage stop 8. It will be seen and understood, from the foregoing, that said operator does not handle the slides 12, after the same have once been placed in the described carrier, as long as any certain series of said slides are in continued use, and that therefore said slides are not in any way subject to be either soiled or broken, and that the change from one slide 12 to another slide can be done with the utmost ease, rapidity and precision.

Having fully described my invention, what I claim as new and desire to secure by Letters Patent, is:—

1. In a slide carrier of the class described, an annular aperture piece, having a series of apertures therethrough, and holding means for removably holding a series of ordinary lantern slides therein; a base for said slide carrier; ways, secured on said base, a carriage, adapted to travel in said ways and to be guided thereby; a stop for stopping said carriage, and a bracket, secured on said carriage, and arranged to rotatably support said slide carrier.

2. In a slide holder of the class described, a rotatable annular aperture piece, having a series of apertures therethrough, and a series of register notches formed in the periphery thereof; flanges secured on said aperture piece, adapted to removably hold a series of ordinary lantern slides on said piece, and in register with said apertures; springs secured on the inner sides of said flanges, and adapted to press said lantern slides against said aperture piece and slide holding studs, formed on said aperture piece for holding said slides in register with said apertures, and registering means, for engaging said notches in said aperture piece, for normally registering the apertures through said aperture piece with the condensing lenses of an ordinary stereopticon lantern.

In testimony whereof I affix my signature in the presence of two witnesses.

CHARLES W. FINCH.

Witnesses:
LUKE E. HINTON,
CHARLES H. SMITH.